United States Patent Office 3,244,213
Patented Apr. 5, 1966

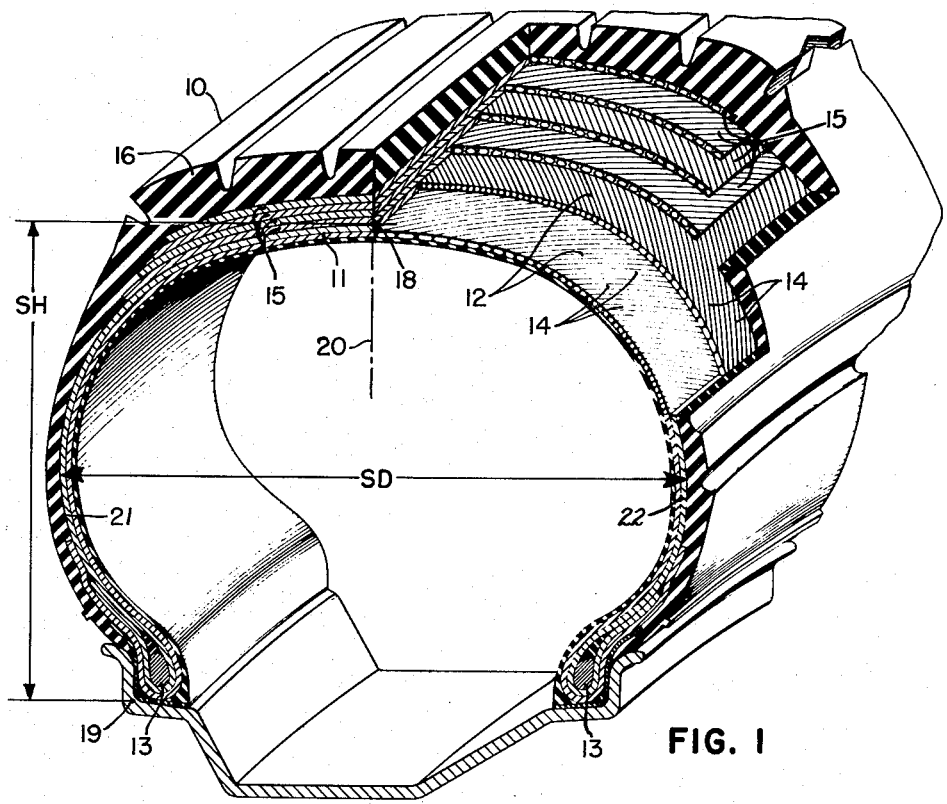
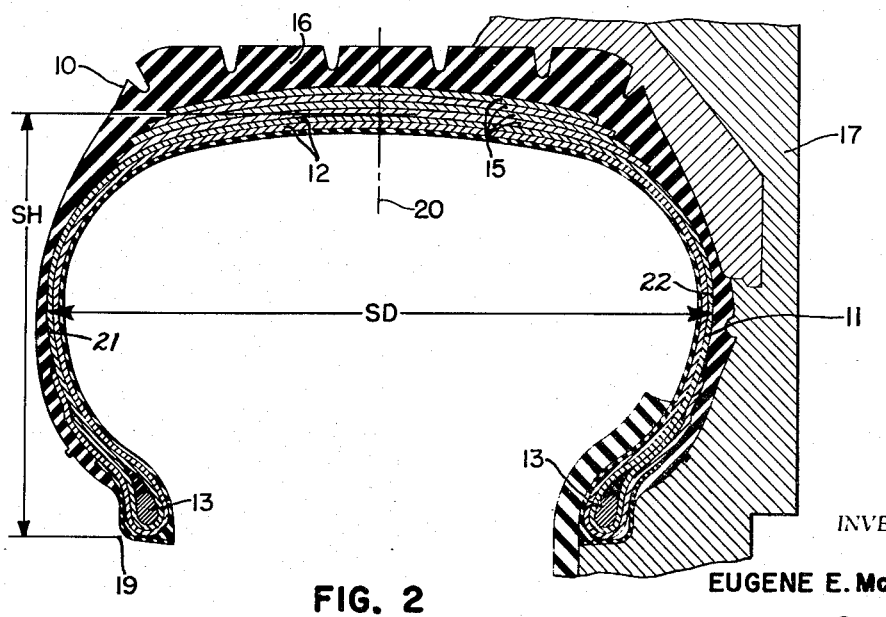

3,244,213
PNEUMATIC TIRE
Eugene E. McMannis, Cuyahoga Falls, Ohio, assignor to The Goodyear Tire & Rubber Company, Akron, Ohio, a corporation of Ohio
Filed Oct. 9, 1963, Ser. No. 315,036
3 Claims. (Cl. 152—354)

This invention relates to an improved pneumatic tire and, more particularly, to a pneumatic tire having an unusually low profile and flat, wide tread.

Conventional tires made with cross-biased cord fabric in the carcass have a number of desirable characteristics but are well known to have relatively poor tread wear, rolling resistance, and traction as compared, for example, to belted tires which include a circumferentially inextensible band between the carcass and the tread. Such belted tires substantially increase tread wear over conventional tires as well as decreased rolling resistance and increased traction. However, belted tires, on the other hand, have a number of undesirable characteristics, including poor sidewall durability, envelopment of road obstacles, harsher riding, higher static steering torque, and substantially increased cost of production.

An object of this invention is to provide a pneumatic tire having a lower ratio of sectional height to sectional width than conventional or belted tires characterized by substantially better tread wear than conventional tires and substantially greater sidewall durability than belted tires.

Another object of this invention is to provide a low profile tire that has greater tread wear, lower rolling resistance, and a greater bead diameter than conventional tires of equal outside diameter and equivalent load-carrying capacity.

Other objects and advantages of this invention will become apparent from the following description when read with reference to the accompanying drawings wherein;

FIG. 1 is a cross-sectional view with parts broken away of the tire of this invention mounted upon a rim and shown in its inflated position;

FIG. 2 is a cross-sectional view with parts broken away of the pneumatic tire of this invention shown in the mold.

Referring to FIG. 1, the pneumatic tire 10 shown herein is comprised of an internally reinforced carcass 11 made of a plurality of plies of rubberized tire fabric which are wrapped around inextensible bead members 13 located at the rim areas of the tire. Each of the carcass plies 12 is made up of rubberized cord fabric composed of a plurality of parallel tire cords 14 disposed side by side to form the tire fabric, and coated on each side with a thin layer of rubber carcass stock. The carcass plies 12 are so arranged that the cords 14 extend from one bead of the tire to the other with the cords of the respective plies crossed and extending in opposite directions. The carcass 11 is formed by the "flat band" method from plies of tire cord fabric in which the cord extends initially at an angle to the edges of the plies, preferably larger than about 57°. A plurality of breaker plies 15 of metal or textile cord fabric, bias cut and with the cords of adjacent plies crossed, are positioned in the crown of the tire beneath the tread 16. After shaping of the carcass 11, and the application of the tread 16, the tire 10 is cured in a mold 17 so that the tire is molded at a substantially lower sectional height than its inflated sectional height.

As further shown in FIG. 2, the tire 10 is cured so that the distance from the radially outer side 18 of the crown of the carcass 11 to the base 19 of the bead, hereinafter called the sectional height and referred to by SH, is substantially smaller than the maximum sectional width or diameter, referred to as SD, measured between the axially outer surfaces 21 and 22 of the sidewalls, of carcass 11. In accordance with this invention, the ratio of the sectional height (SH) to the maximum sectional diameter (SD) of the inflated tire is between .6 and .85. The cord angle of each of the plies 12 relative to the centerline 20 of the tire is between 32° and 45°, and progressively increases toward the beads as is characteristic of tires formed by the flat band method. Cord angle of the breaker plies 15 relative to the centerline 20 of the tire is between 20° and 27°.

The cords of the plies 12 and 15 are made of a synthetic textile material, such as rayon, nylon, or Dacron but the cord of the plies 15 may also be made of metallic wire or glass fiber.

When the tire of this invention is mounted on a rim and inflated, its sectional height substantially increases and its sectional diameter decreases. This characteristic of the tire of this invention is the exact converse of high molded conventional ply tires which do not increase in sectional height upon inflation and substantially increase in sectional diameter upon inflation of the tire.

As shown in FIG. 1 of the drawings, the tire of this invention having a ratio of SH to SD of greater than .6 but less than .85 when inflated, has a ration of sectional height to sectional width when molded of less than .7. Preferably, the molded tire has a ratio of SH to SD up to 25 percent less when molded than when the tire is inflated. The sectional height of the tire of this invention preferably is 3 to 15 percent greater when inflated than the sectional height of the tire when molded so that the radius from the axis of rotation of the inflated tire to the crown of the carcass is 1 to 6 percent greater than the said radius when molded.

Since the inflated tire of this invention having a very low profile is molded in a mold such that the outside diameter and the sectional height of the carcass is substantially less than the SD and SH of the inflated tire, the stresses between the cords in the crown during operation of the tire are relieved as the tire passes through the road contact area because the cords in the crown of the tire are moved closer to the molded shape thereof which reduces some of the stresses caused by inflation of the tire. This is in direct contrast with conventional ply tires wherein the tire is cured in a mold having an SD equal to or greater than the SD of the inflated tire. Thus, in a conventional tire the stresses are increased upon inflation and further increased as the tire passes through the road contact area.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire construction comprising in combination a tread and toroidal shaped carcass having spaced beads and a plurality of parallel cord plies extending from bead to bead, said carcass having a low profile cross-sectional shape in which the ratio of sectional height to sectional width of said carcass when inflated is between .6 and .85, the cord angle of said plies being between 32° and 45° at the centerline of said tire and progressively increasing toward said beads, a plurality of parallel cord breaker plies disposed below said tread and adjacent said carcass having cord angles of from 20° to 27° relative to the centerline of the tire tread, said tire as molded having a said ratio of substantially less than said ratio when the tire is inflated so that the inflated tire has a greater outside diameter and lesser sectional width than when said tire is uninflated.

2. A pneumatic tire construction as claimed in claim 1 in which when the tire is inflated the radius from the axis of rotation of the tire to the crown of the carcass is from 1 to 6% greater than said radius when the tire is uninflated.

3. A pneumatic tire construction comprising in combination a thread and toroidal shaped carcass having spaced beads and a plurality of parallel cord plies extending from bead to bead, said carcass having a low profile cross-sectional shape in which the ratio of sectional height to sectional width of said carcass when inflated is between .6 and .85, the cord angle of said plies being between 32° and 45° at the centerline of said tire and progressively increasing toward said beads, a plurality of parallel cord breaker plies disposed below said tread and adjacent said carcass having cord angles of from 20° to 27° relative to the centerline of the tire tread, said tire as molded having a said ratio substantially less than said ratio when inflated so that the inflated tire has a sectional height 5 to 15 percent greater than when said tire is molded.

References Cited by the Examiner
UNITED STATES PATENTS

| | | | |
|---|---|---|---|
| 1,554,370 | 9/1925 | Renner | 152—352 X |
| 1,846,042 | 2/1932 | Taylor | 152—352 |
| 2,237,819 | 4/1941 | Hawkinson | 152—352 X |
| 2,786,507 | 3/1957 | Howe et al. | 152—356 |
| 2,943,663 | 7/1960 | Antonson | 152—356 |

OTHER REFERENCES

1963 Yearbook, The Tire and Rim Assn. Inc.

ARTHUR L. LA POINT, *Primary Examiner*.